Patented Jan. 6, 1925.

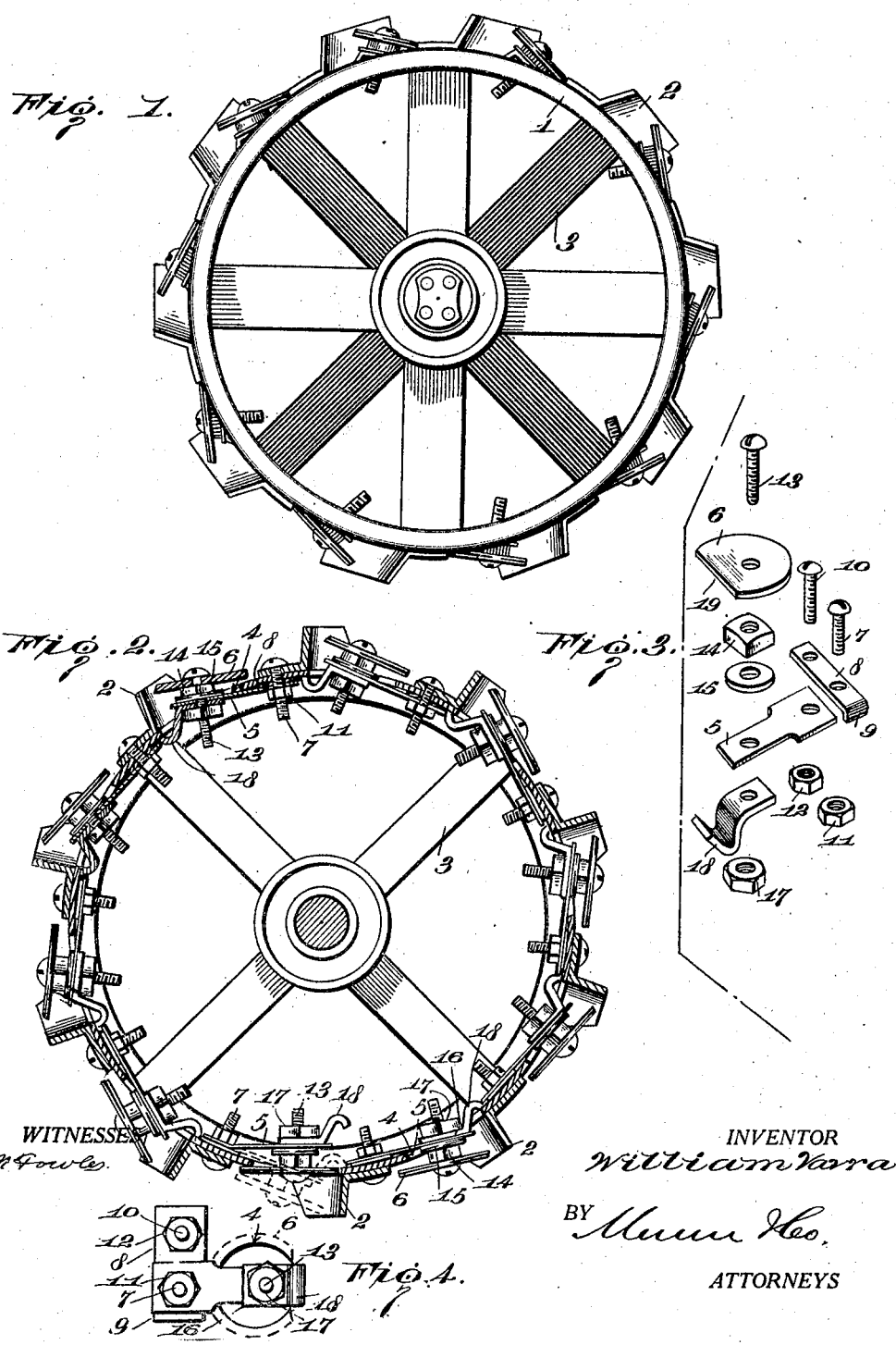

1,521,798

UNITED STATES PATENT OFFICE.

WILLIAM VAVRA, OF CLARKSON, NEBRASKA.

TRACTOR WHEEL.

Application filed November 13, 1923. Serial No. 674,554.

*To all whom it may concern:*

Be it known that I, WILLIAM VAVRA, a citizen of the United States, and a resident of Clarkson, in the county of Colfax, in the State of Nebraska, have invented certain new and useful Improvements in Tractor Wheels, of which the following is a specification.

My invention relates to improvements in tractor wheels and it consists of the constructions, combinations and arrangements herein described and claimed.

An object of the invention is to provide means in a tractor wheel to clear the lugs of mud and dirt as the wheel goes around.

Other objects and advantages will appear from the following specification, reference being had to the accompanying drawing, in which, Figure 1 is a side elevation of a tractor wheel showing the cleaning plates applied, Figure 2 is a longitudinal section of the tractor wheel, Figure 3 is a view showing all of the various parts of one of the cleaning plates disassembled, Figure 4 is a detail plan view illustrating the manner of mounting the leaf spring on the inside of the rim.

The tractor wheel 1 may be of any ordinary construction, so for as the rim per se, lugs 2, spokes 3, et cetera are concerned. The corners formed by the upstanding lugs and the adjacent surface of the wheel rim often become filled with dirt as the wheel proceeds over the ground, with the result that it soon becomes quite impossible for the wheel to procure the desired grip on the ground. It is for this purpose that the lugs are designed, and obviously the purpose of the lugs is defeated if no means is provided for removing the dirt while the wheel is in operation.

It is the purpose of the invention to clear each lug of dirt as each lug rises sufficiently high above the ground to let the clearing means operate. There is an opening 4, circular or otherwise, in the rim 1 immediately behind each of the lugs 2. A leaf spring 5 carries a plate 6 which operates close enough to the adjacent lug to remove the dirt as the spring 5 moves outwardly.

The spring 5 is fastened inside of the wheel, but that end which carries the plate 6 extends through the opening 4 when the spring is not under tension. This is well shown in Figure 2. The fastening means of the spring comprises a bolt 7 which passes through the rim 1 and also through the flange of the nearest lug 2, the head being on the outside. The spring rests on a keeper 8 which has an upstanding flange 9 engaging one side of the spring (see Figure 4) to keep the spring from turning. The bolt 7 and another bolt 10 secure the keeper in a position transversely of the rim 1. The bolt 10 does not pass through the flange of the adjacent lug 2, as does the bolt 7, because the lug is on a bias and the flange will therefore be avoided by the second bolt 10. Nuts 11 and 12 secure the respective bolts.

A bolt 13 secures the plate 6 on the spring 5. This bolt passes through suitable spacers 14 and 15 and a keeper 16 which a nut 17 engages on the inside of the wheel. The spacers 14 and 15 may consist of a nut and washer respectively, or any kind of spacing means may be used. The purpose of the spacing means is to dispose the plate 6 at a suitable distance from the outer wheel surface when the spring 5 is extended as shown in the majority of instances in Figure 2.

The keeper 16 performs two functions, one, that of a keeper in respect to the nut 17, the other, that of limiting means to the outward movement of the spring 5. To the latter end the free end of the keeper is bent up and curved over at 18 so that the adjacent portion of the wheel rim may be engaged to serve the purpose stated.

The operation may be readily understood from the foregoing description. It has already been stated that the spaces or corners next to the lugs 2 have a tendency to become filled with dirt and that it is important to dislodge this dirt so that the lugs may engage into the ground and secure the grip for the tractor wheel. It is particularly important that the dirt behind the lugs be removed, because it is the rear surfaces of the lugs that push against the ground. The plates 6 are intended primarily to dislodge the dirt behind the lugs, but they also will loosen the dirt in front of the lugs to some extent, at least.

It has not been stated before that the plates 6 are circular. They are so shown in Figure 3. They may be of other shapes, but when they are made circular, one side should be cut away at 19 (Figure 3) so that they may work next to the rear faces of the lugs 2 to better effect. Assume one of the plates to be depressed as is the lower part in Figure 2. The spring 5 yields and the plate 6 contacts the outside of the rim 1. The plate 6 is larger than the opening 4 to prevent the plate from passing through to the inside. The plate recedes so far toward the base of the adjacent lug 2 at the front that the lug may sink well into the ground and secure the grip desired.

As soon as the wheel proceeds far enough to relieve the tension of the spring 5, the spring will immediately straighten outwardly toward the hole or opening 4, and in moving the plate 6, will cause that plate to dislodge any dirt that may adhere in the corner behind the adjacent lug. The edge 19 of the cleaning plate does not necessarily scrape against the rear surface of the lug. It is only necessary to make the plate reciprocate behind the lug, because the movement of the plate will loosen the dirt so that it falls off of its own accord.

While the construction and arrangement of the improved tractor wheel is that of a generally preferred form, obvious modifications and changes may be made without departing from the spirit of the invention or the scope of the claims.

What is claimed:—

1. A tractor wheel comprising a rim having lugs, a plate situated adjacent to each lug for the purpose of dislodging dirt as the wheel proceeds over the ground, and single resilient means by which each plate is carried permitting the plate to seat against the rim when put under pressure by contact with the ground and to recede from the rim when the wheel moves far enough to relieve said pressure.

2. A tractor wheel comprising a rim having an opening and an adjacent lug, a plate situated adjacent to the lug for the purpose of dislodging dirt, single means mounted inside of the rim extending through the opening and carrying said plate, and means on said single carrying means limiting the outward movement of the carrying means.

3. A tractor wheel comprising a rim with an opening and an adjacent lug, resilient means fastening on the inside of the rim extending toward and through the opening, a plate situated adjacent to the lug for the purpose of dislodging dirt, means by which the plate is mounted on said resilient means in the region of the opening, said resilient means yielding to permit said plate to contact the rim when under pressure in the passage of the wheel over the ground, and means carried by said resilient means to engage behind the rim and limit the outward movement thereof when said pressure on the plate is relieved.

4. A tractor wheel comprising a rim with an opening and a lug adjacent to the opening, a leaf spring situated inside of the wheel extending toward and through the opening, means by which the spring is fastened to the rim at one end, means by which the spring is prevented from turning on said fastening means, a plate situated adjacent to the lug outside of the wheel, said plate being larger than the opening, means by which the plate is mounted on the other end of the spring, said plate contacting the rim as the spring recedes from the opening when the plate is put under pressure in the passage of the wheel over the ground, and means carried by said spring mounting means to engage the inside of the rim and limit the outward movement of both the spring and plate when said pressure is relieved.

5. A tractor wheel comprising a rim having an opening and lugs with flanges at either side of the opening, a leaf spring situated inside of the wheel extending toward and through the opening, fastening means for the spring extending through the flange of one of the lugs, rim and one end of the spring, means to keep the spring from turning in respect to the opening, and a plate carried by the free end of the spring outside of the wheel to reciprocate with respect to the adjacent lug as the spring flexes under the application and relief of pressure on the plate as the wheel passes over the ground.

6. A tractor wheel comprising a rim having an opening and a lug, a leaf spring situated inside of the wheel extending toward and through the opening, a keeper upon which one end of the spring rests having an upstanding flange to engage one side of the spring and keep it from turning with respect to the opening, means fastening both the keeper and spring to the rim, a plate situated outside of the rim adjacent to the lug being larger than the opening, means to fasten the plate to the free end of the spring including means to space the plate from the rim upon straightening of the spring, and a keeper for said fastening means including a bent end which engages the inside of the rim when the spring is straightened to limit the outward movement of both the spring and plate.

7. A tractor wheel comprising a rim having an opening and an adjacent lug, a resilient plate located upon the rim to extend toward the opening, and means by which the plate is fixedly mounted at one end leaving the other end free to be movable in respect to the lug when put under pressure and again released.

WILLIAM VAVRA.